United States Patent
Burke et al.

(10) Patent No.: US 8,909,153 B2
(45) Date of Patent: Dec. 9, 2014

(54) VEHICLE COMMUNICATIONS USING A MOBILE DEVICE

(75) Inventors: Denis R. Burke, Canton, MI (US); Danilo Gurovich, Grosse Pointe Farms, MI (US); Daniel E. Rudman, West Bloomfield, MI (US); Keith A. Fry, Rochester Hills, MI (US); Shane M. McCutchen, Howell, MI (US); Marco T. Carnevale, Windsor (CA); Mukesh Gupta, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 272 days.

(21) Appl. No.: 13/604,234

(22) Filed: Sep. 5, 2012

(65) Prior Publication Data

US 2014/0066132 A1    Mar. 6, 2014

(51) Int. Cl.
*H04B 7/00* (2006.01)
*H04M 1/00* (2006.01)
*H05K 11/02* (2006.01)

(52) U.S. Cl.
USPC ....... 455/41.2; 455/66.1; 455/569.2; 455/345

(58) Field of Classification Search
USPC ........ 455/41.2, 41.3, 66.1, 569.1, 569.2, 344, 455/345; 704/231, 246, 251
See application file for complete search history.

(56) References Cited

U.S. PATENT DOCUMENTS

| | | | |
|---|---|---|---|
| 8,565,838 B2 * | 10/2013 | Nicolini | 455/569.2 |
| 8,577,543 B2 * | 11/2013 | Basir et al. | 701/31.4 |
| 2007/0005206 A1 * | 1/2007 | Zhang et al. | 701/36 |
| 2010/0097239 A1 * | 4/2010 | Campbell et al. | 340/825.25 |
| 2012/0252405 A1 * | 10/2012 | Lortz et al. | 455/410 |

* cited by examiner

*Primary Examiner* — Nguyen Vo
(74) *Attorney, Agent, or Firm* — Anthony Luke Simon; Reising Ethington P.C.

(57) ABSTRACT

A method of providing hands-free services using a mobile device having wireless access to computer-based services includes establishing a short-range wireless connection between a mobile device and a vehicle; receiving speech in the vehicle that is communicated to a mobile voice platform resident on the mobile device via the short-range wireless connection; parsing the received speech using the mobile voice platform to identify vehicle-specific vocabulary; when vehicle-specific vocabulary exists, identifying at least one vehicle-specific vocabulary term that affects vehicle operation; identifying at least one vehicle function of an interrelated group of vehicle functions that is associated with the identified vehicle-specific vocabulary; determining whether to access one or more cloud services based on the identity of the vehicle function; generating a text-based command reflecting audible control of the affected vehicle function; and sending the text-based command from the mobile device to the vehicle over the short-range wireless connection.

17 Claims, 12 Drawing Sheets

VEHICLE COMMUNICATIONS USING A MOBILE DEVICE

TECHNICAL FIELD

The present invention relates to speech interfaces to computer-based services obtained wirelessly from a cellular phone or other mobile device, and to such interfaces implemented in a vehicle such as a passenger car.

BACKGROUND

Speech-based human-machine interfaces (HMI) to vehicle functions and cellular phone functions and applications typically involve an application-specific or function-specific limited command set that requires syntactically constrained interactions between the user and HMI. In these systems, inputted speech may be converted into a specific command for a specific application, but there is typically only limited ability to identify and carry out different services involving different applications or service providers.

In the realm of cellular phone use in vehicles, systems have been proposed and some implemented that help reduce driver distraction by providing a hands-free telephony experience as well as carry out some basic vehicle control tasks, such as selecting and controlling radio and other infotainment services on the vehicle. In some systems, this is done using an embedded cellular phone that has access to at least portions of the vehicle electronics so as to permit control and reporting via a speech user interface. In other vehicles, the driver or other occupant's personal mobile device (e.g., cellular phone) is used for this purpose, with the vehicle providing a basic audio interface that includes a microphone and one or more speakers, as well as a Bluetooth or other wireless connection to the mobile device. This permits speech and other audio to be sent between the audio interface and mobile device in either direction. However, these systems are typically limited to only enabling a few basic mobile device functions such as calling and controlling music selection and playback. They do not provide access to the many other built-in and user added applications and functions typically available today.

For example, there is now widespread availability and use of mobile devices such as smartphones that permit user downloading and installing of relatively small software applications (apps). Some of these smartphones have built-in speech support, either via the operating system (OS), such as in the case of the Android™ OS, or via a built-in app such as Siri™ available on the iPhone4S™. See, for example, WO2011088053 published Jul. 21, 2011. While providing a greater level of integration, these commercially-available systems are not configured to provide a fully hands-free experience with the mobile device since they still rely heavily on the screen to interact with the user during the speech session.

SUMMARY

According to an aspect of the invention, a method of providing hands-free services using a mobile device having wireless access to computer-based services includes establishing a short-range wireless connection between a mobile device and a vehicle; receiving speech in the vehicle that is communicated to a mobile voice platform resident on the mobile device via the short-range wireless connection; parsing the received speech using the mobile voice platform to identify vehicle-specific vocabulary; when vehicle-specific vocabulary exists, identifying at least one vehicle-specific vocabulary term that affects vehicle operation; identifying at least one vehicle function of an inter-related group of vehicle functions that is associated with the identified vehicle-specific vocabulary; determining whether to access one or more cloud services based on the identity of the vehicle function; generating a text-based command reflecting audible control of the affected vehicle function; and sending the text-based command from the mobile device to the vehicle over the short-range wireless connection.

According to another aspect of the invention, a method of providing hands-free services using a mobile device having wireless access to computer-based services includes receiving vehicle information relating to vehicle function at a mobile device from a vehicle linked to the mobile device via a short-range wireless connection; presenting an audible message to a vehicle occupant that conveys at least some of the received vehicle information in response to the received vehicle information; receiving speech input at the mobile device from the vehicle occupant in reply to the audible message; identifying vehicle-specific vocabulary included in the received speech input using a mobile voice platform resident on the mobile device that is capable of carrying out speech recognition using a cloud-based service; and audibly controlling one or more vehicle functions chosen from an inter-related group of vehicle functions based on the identified vehicle-specific vocabulary included in the received speech.

According to yet another aspect of the invention, a system of providing hands-free services using a mobile device capable of both short-range wireless communications and cellular communications, wherein the mobile device wirelessly receives spoken input from a vehicle occupant via an audio user interface integrated with a vehicle as well as vehicle data generated by one or more vehicle system modules on the vehicle; and a mobile voice platform software application stored on the mobile device capable of accessing cloud services upon detecting vehicle-related vocabulary in the received spoken input, generating an audibly-playable response to the vehicle occupant when the detected vehicle-related vocabulary affects one or more aspects of vehicle operation, and carrying out a vehicle command included with the spoken input that affects one or more vehicle system modules.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below provide a mobile voice platform that (1) enable hands-free communication between a vehicle occupant and the occupant's cellular phone or other mobile device without the need to physically interact with the mobile device, and (2) does so in a manner that enables broad support to some or all of the Internet-based and other computer-based services available to the user via the mobile device. As used herein, "services" generally include the provision of information, control, and/or communication assistance to the mobile device user. Further, as used herein, a service being used on or accessed via the mobile device includes those provided by way of applications installed on the mobile device as well as computer-based services that are only available by communication with a remote server. These latter computer-based services are also referred to as "cloud services" and may be supplied by any service provider having an accessible server that is available over a private or public network, such as an intranet or the Internet.

Figure 1:
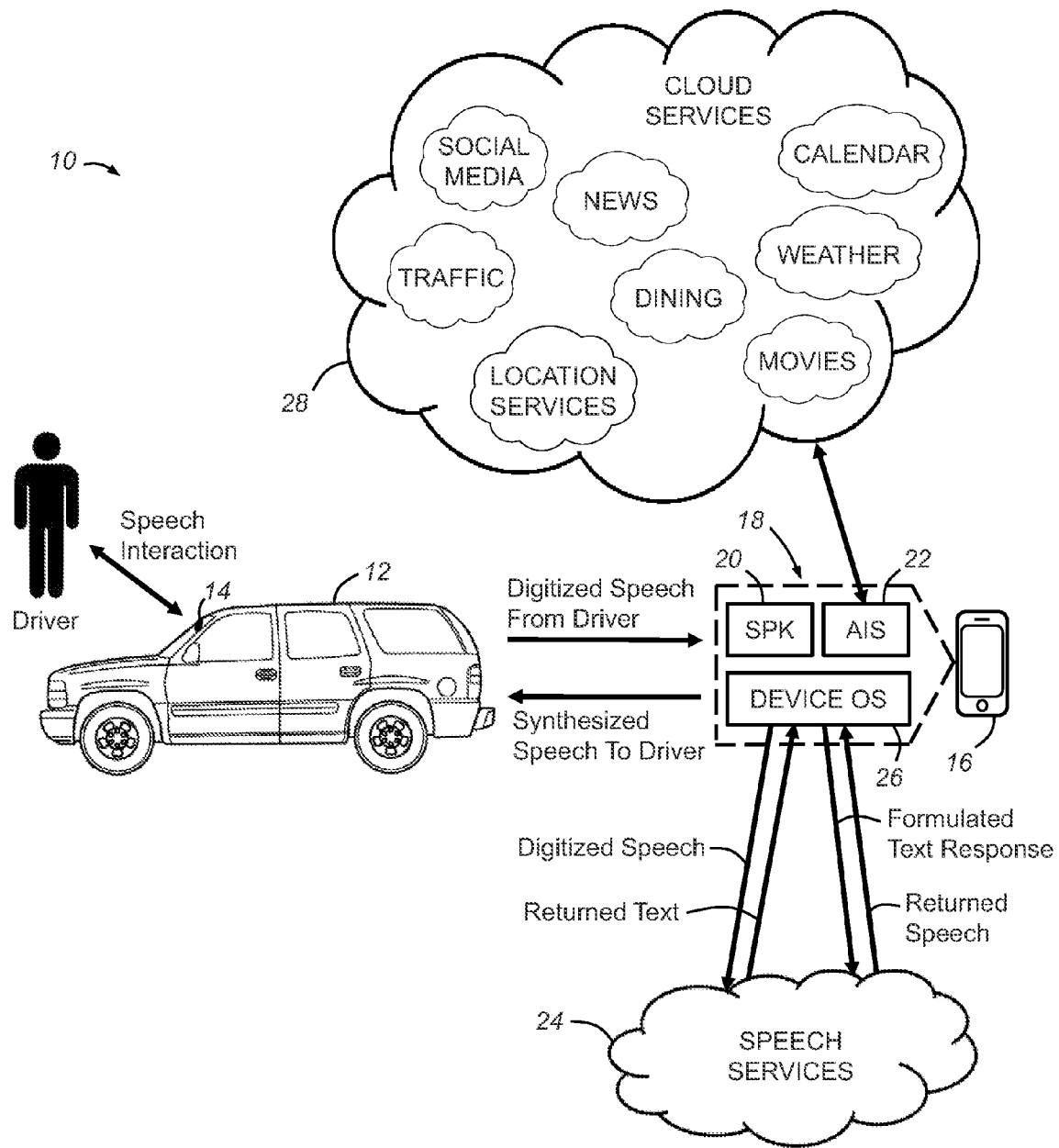
FIG. 1 diagrammatically depicts the portions of the hardware and methodology used to provide a speech user interface in accordance with an embodiment of the invention.

FIG. 1 depicts one embodiment of a speech-based user interface 10 as it could be used for providing services via a mobile device to a vehicle driver in a hands-free manner. As used herein "hands-free" means that the user can or has carried out some or all of a completed speech-based session using the mobile device without physical interaction or control of the device. "Fully hands-free" means that the user can or has carried out all of a completed speech-based session using the mobile device without physical interaction or control of the device. Some embodiments can be implemented to provide a hands-free experience that may require some interaction with the mobile device, such as to place it in a listening mode, while other embodiments can be carried out fully hands-free while, for example, the mobile device is in the user's pocket, purse, or briefcase, with no physical access needed to the device.

In the illustrated embodiment, a driver of a vehicle 12 interacts via speech with an on-board, installed audio user interface 14 that communicates via a short range wireless connection with the driver's mobile device 16, which in this case is a cellular phone. Mobile device 16 can be any portable device capable of wireless communication and digital processing whether using a microprocessor or some simpler or more complex circuitry. Thus, mobile devices include cellular phones, PDAs, laptops, notebooks, netbooks and other personal electronic devices. The cellular phone 16 depicted in FIG. 1 is commonly referred to as a smartphone given that it permits the user to add software applications (apps) to the smartphone that perform functions beyond telephony. Phone 16 includes a touchscreen interface, one or more manual pushbuttons, a microphone, speaker, and internal circuitry (hardware) including a microprocessor, memory for storage of software and data, and communication circuitry that includes at least short range wireless communication technology such as Bluetooth and/or WiFi, but also cellular communication technology such as a cellular chipset for CDMA, GSM, or other standardized technology. These various components of mobile device 16 may be conventional if desired, and thus are not separately illustrated or described in detail herein.

Apart from the mobile device hardware, cellular phone 16 includes a mobile voice platform (MVP) 18 comprising software running on the mobile device. MVP 18 includes a speech platform kernel (SPK) 20 and an application interface suite (AIS) 22, both of which are program modules comprising computer instructions that, upon execution by the device's processor, carry out their respective module's functions, as will be described below. Rather than providing automated speech processing (ASR) on the mobile device itself, remotely located (cloud) speech services 24 are used, although in some embodiments ASR can be carried out on the mobile device 16, either with or without access to remotely located speech modules, grammars, and computing facilities. Mobile device 16 also includes an operating system (OS) 26 that provides root level functions, including for example inter-application communication mechanisms and input/output (I/O) interfacing between device hardware and the software modules and applications running on device 16. Included in these hardware interfacing functions of the OS are the communication protocols used by the device to communicate with the speech services 24 as well as other cloud services 28 that are available via the Internet or other network. Any computer-based service can be included in the list of cloud services 28, but shown in FIG. 1 are some of those services most useful to users of cellular phones; i.e., social media, location services (e.g., navigation), traffic, weather, news, calendaring, dining, and movies. Many others exist.

In general, hands-free access to services using mobile voice platform 18 will involve carrying out a completed speech session via mobile device 16 without any physical interaction with the mobile device. This broadly includes receiving a speech input from a user, obtaining a service result from a cloud service that is responsive to the content of the speech input, and providing the service result as a speech response presented to the user. Using vehicle 12 of FIG. 1, the driver (user) may interact with the mobile device to carry out the speech session via the audio interface 14. This may include establishing a short range wireless connection between the in-vehicle audio interface 14 and mobile device 16 that then allows the microphone and speaker of the audio interface to be used to receive and present speech, respectively, to the driver or other occupant. The speech input may be sent as digitized speech over this short range wireless connection via a digital communication protocol such as Bluetooth or WiFi. The digitized speech input may then be sent from the mobile device 16 via a cellular or other wireless communication system to the speech services 24 to carry out speech-to-text (STT) services that involve automated speech recognition, or text-to-speech (TTS) services that provide either synthesized or recorded speech or speech portions (e.g., phonemes) for use in generating an audio message that provides a suitable speech response to the speech input. The speech recognition results (e.g., returned text) is then processed by the SPK 20 to ultimately determine the appropriate (desired) service to be used to carry out the user's request. Once the desired service(s) have been determined, a service request is formed using the commands and parameters supported by the particular service selected using one or more service interfaces from the application interface suite (AIS)

22, as will be discussed in greater detail below. The service request is sent to the desired service (installed app and/or cloud service) and a service result is received back. That service result is then used to generate a natural language speech response; that is, using conversational language and sentence/clause structures that are familiar and context-specific. The speech response may be an audio message that is initially built as a text response from information in the service result as well as from other available information such as session variables and context-specific items, as will be discussed in greater detail below. Once the text response has been formulated, it is converted to an audio speech response (e.g., audio message), and this can be done either on the mobile device 16 itself, or using the TTS services 24. The audio message may then be sent from the mobile device to the audio user interface 14 via the short range wireless connection for presentation to the vehicle occupant over the vehicle speaker(s).

Figure 2:
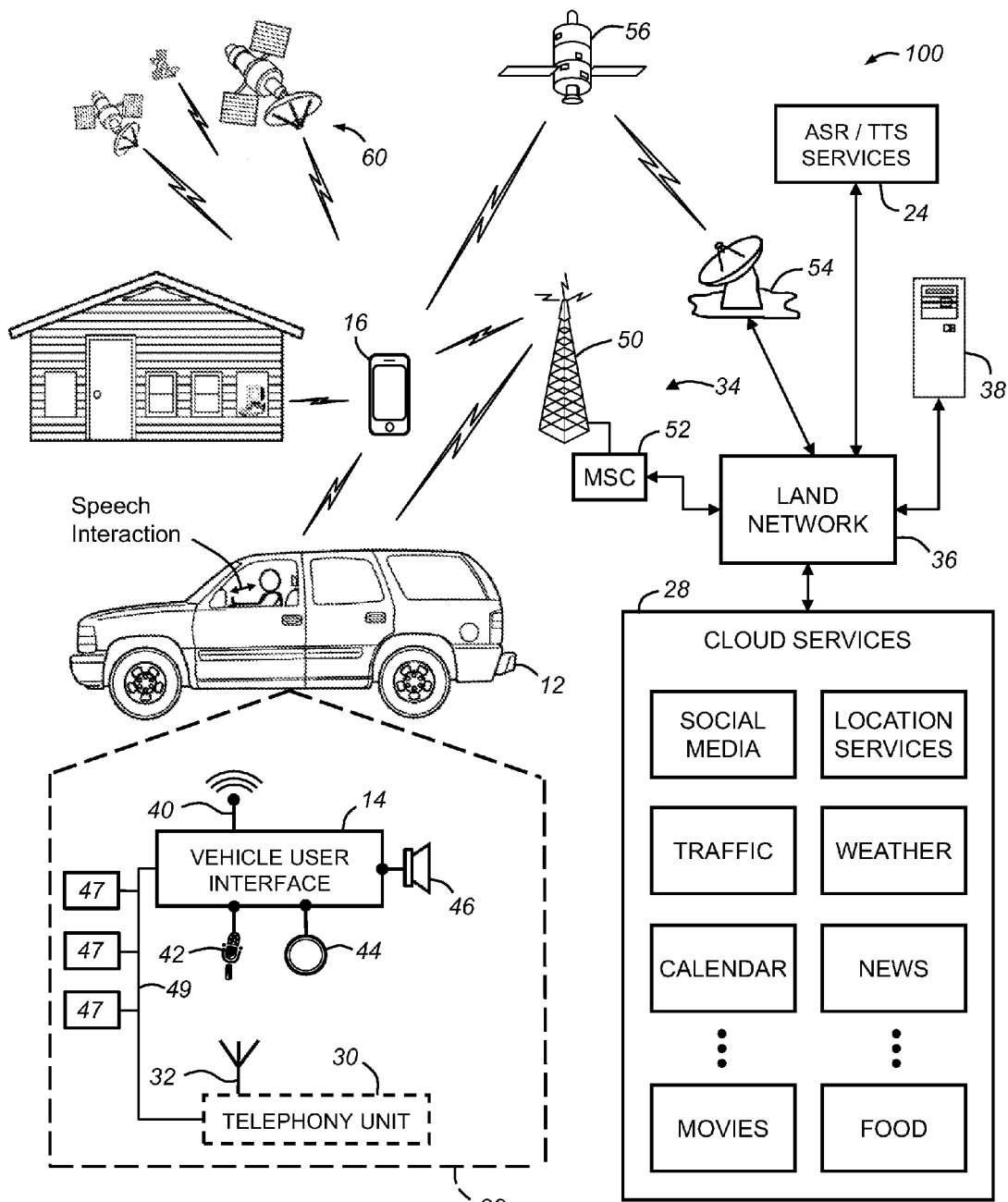
FIG. 2 is a block diagram depicting an embodiment of a communications system that is capable of utilizing the speech user interface of FIG. 1 as well as the methods disclosed herein.

Turning now to FIG. 2, there is shown an operating environment that comprises a mobile vehicle communications system 100 that incorporates the speech-based user interface (SUI) 10 and that can be used to implement the methods disclosed herein. Communications system 100 generally includes the vehicle 12 and its audio user interface 14, mobile device 16, speech services 24, and cloud services 28, as well as some of the system infrastructure not shown in FIG. 1, including one or more wireless carrier systems 34 and a land communications network 36. Other optional equipment, facilities, and systems can be included, such as a computer 37, call center 38, residence or other fixed local area network facility 39, satellite communication system with fixed antenna 54 and one or more satellites 56, and also a constellation 58 of GPS satellites for navigation. It should be understood that the disclosed method can be used with any number of different systems and is not specifically limited to the operating environment shown here. Also, the architecture, construction, setup, and operation of the components of system 100 not described herein are generally known in the art. Thus, the following paragraphs simply provide a brief overview of one such communications system 10; however, other systems not shown here could employ the disclosed method as well.

Vehicle 12 is depicted in the illustrated embodiment as a sports utility vehicle (SUV), but it should be appreciated that any other vehicle including passenger cars, trucks, motorcycles, recreational vehicles (RVs), marine vessels, aircraft, etc., can also be used. Some of the vehicle electronics 29 are shown generally in FIG. 2 and include a telematics or telephony unit 30 that communicates wirelessly with carrier system 34 via an antenna 32 and other circuitry known to those skilled in the art. Vehicle electronics 29 also include the audio user interface 14 which includes an antenna 40 for short range wireless communication, a microphone 42, one or more pushbuttons or other control inputs 44, and one or more speakers 46. Other user interface components can be included in the vehicle or as a part of the audio user interface 14, such as a visual display (not shown). The audio user interface 14 may be a substantially standalone set of components communicating only via antenna 40, or may be hardwired or otherwise connected into other modules or portions of the vehicle's electronics system, such as to telephony unit 30 and/or a vehicle bus. This may permit, for example, the vehicle to be programmed so as to reduce ambient noise during a speech session such as by, for example, reducing the climate control fan speed, quieting the vehicle radio, etc.

Apart from the audio user interface 14 and telephony unit 30, the vehicle 12 can include vehicle system modules (VSMs) 47 in the form of electronic hardware components that are located throughout the vehicle 12 and typically receive input from one or more sensors and use the sensed input to perform diagnostic, monitoring, control, reporting, and/or other functions that relate to vehicle operation. Each of the VSMs 47 is preferably connected by communications bus 49 to the other VSMs, the audio user interface 14, as well as (optionally) to the telephony unit 30, and can be programmed to run vehicle system and subsystem diagnostic tests. As examples, one VSM 47 can be an engine control module (ECM) that controls various aspects of engine operation such as fuel ignition and ignition timing, another VSM 47 can be a powertrain control module that regulates operation of one or more components of the vehicle powertrain, and another VSM 47 can be a body control module that governs various electrical components located throughout the vehicle, like the vehicle's power door locks and headlights.

According to one embodiment, the VSM 47, such as the body control module, can generate data for and/or ultimately control the function of one or more vehicle systems (e.g., climate controls, radio controls, fuel systems, etc.). For instance, with respect to a fuel system, the VSM 47 can obtain data reflecting the amount of fuel on the vehicle 12 from a sensor located in a fuel tank. In another instance, the VSM 47 can monitor the vehicle radio to generate data (e.g., data indicating what song is playing or what station the radio is tuned to) and to command the radio (e.g., turn up the volume or change the station). According to another embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

As used herein, the term "audio user interface" broadly includes any suitable installation of a microphone and speaker in the vehicle, including both hardware and any software components, which enables a vehicle user to communicate verbally with the vehicle or other devices in the vehicle, such as mobile device 16. Microphone 42 provides audio input that can be sent via the short range wireless connection using antenna 40. One or more pushbutton(s) 44 allow manual user input into the audio user interface to initiate actions such as the start of a speech session in which the microphone 42 and speaker 46 are used to provide the user with hands-free services in the vehicle such as to carry out wireless telephone calls or access data, provide remote control or provide messaging and communication services. The pushbutton may be located in a convenient spot for the driver, such as on the steering wheel hub or spokes. Speaker 46 may be a single speaker dedicated for use with the audio user interface 14 or may be integrated with other components or systems, such as a radio system speaker.

In the illustrated embodiment, telephony unit 30 is an optional component that is not used in carrying out the operation of the speech user interface (SUI) 10, but in other embodiments can be included and can be integrated in with the audio user interface as a single functional module. Telephony unit 30 can be an OEM-installed (embedded) or aftermarket device that is installed in the vehicle and that enables wireless voice and/or data communication over wireless carrier system 34 and via wireless networking. This enables the vehicle to communicate with call center 38, other telematics-enabled vehicles, or some other entity or device. The telephony unit preferably uses radio transmissions to establish a communications channel (a voice channel and/or a data channel) with wireless carrier system 34 so that voice and/or data transmissions can be sent and received over the channel. By providing both voice and data communication, telephony unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 38) and data communication (e.g., to provide GPS location data or vehicle diagnostic data to the call center 38), the system can utilize a single call over a voice channel and switch as needed between voice and data transmission over the voice channel, and this can be done using techniques known to those skilled in the art. For location services, the telephony unit may have its own GPS circuitry, or can utilize other available GPS devices, such as one installed in the vehicle as a part of a vehicle navigation system, or using one from the mobile device 16.

Wireless carrier system 34 is preferably a cellular telephone system that includes a plurality of cell towers 50 (only one shown), one or more mobile switching centers (MSCs) 52, as well as any other networking components required to connect wireless carrier system 34 with land network 36. Each cell tower 50 includes sending and receiving antennas and a base station, with the base stations from different cell towers being connected to the MSC 52 either directly or via intermediary equipment such as a base station controller. Cellular system 34 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 34. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 34, a different wireless carrier system in the form of satellite communication can be used to provide uni-directional or bi-directional communication with the vehicle. This can be done using one or more communication satellites 56 and an uplink transmitting station 54. Uni-directional communication can be, for example, satellite radio services, wherein programming content (news, music, etc.) is received by transmitting station 54, packaged for upload, and then sent to the satellite 52, which broadcasts the programming to subscribers. Bi-directional communication can be, for example, satellite telephony services using satellite 56 to relay telephone communications between the vehicle 12 and station 54. If used, this satellite telephony can be utilized either in addition to or in lieu of wireless carrier system 34.

Land network 36 may be a conventional land-based telecommunications network that is connected to one or more landline telephones and connects wireless carrier system 34 to such things as speech services 24, cloud services 28, and other computers or servers 37, such as a personal computer located in a residence 39 or other facility. For example, land network 36 may include a public switched telephone network (PSTN) such as that used to provide hardwired telephony, packet-switched data communications, and the Internet infrastructure. One or more segments of land network 36 could be implemented through the use of a standard wired network, a fiber or other optical network, a cable network, power lines, other wireless networks such as wireless local area networks (WLANs), or networks providing broadband wireless access (BWA), or any combination thereof. Furthermore, the various speech and cloud services shown in FIG. 2 need not be connected via land network 36, but could include wireless telephony equipment so that it can communicate directly with a wireless network, such as wireless carrier system 34.

Computer 37 can be one of a number of computers accessible via a private or public network such as the Internet. Each such computer 37 can be used for one or more purposes, such as a web server accessible by the vehicle over wireless carrier 34 via audio user interface 14/mobile device 16, and/or via telephony unit 30. Other such accessible computers 37 can be, for example: a service center computer where diagnostic information and other vehicle data can be uploaded from the vehicle via the telephony unit 30; a client computer used by the vehicle owner or other telematics service subscriber for such purposes as accessing or receiving vehicle data or to setting up or configuring subscriber preferences or controlling vehicle functions; or a third party repository to or from which vehicle data or other information is provided. A computer 37 can also be used for providing Internet connectivity such as DNS services or as a network address server that uses DHCP or other suitable protocol to assign an IP address to the vehicle 12 and/or to the mobile device 16. When used as a client computer 37 by the vehicle owner, such as within a residence 39, wireless connectivity between the mobile device 16 and computer 37 may be provided using any suitable short range wireless communication technology, such as Bluetooth or any of the 802.11 protocols.

Shown in FIG. 2 as one of the cloud services is a call center 38 which can be used to provide the vehicle operator and/or the vehicle electronics 29 with a number of different vehicle-related services and system back-end functions. These include such things as roadside or emergency assistance, diagnostic and maintenance support, entertainment services, information and navigation assistance, etc., as is known in the art. These call center services can be provided to supplement those accessible to the vehicle operator via the speech user interface 10, or as a backup in case the operator is having difficulty with the speech user interface.

Figure 3:
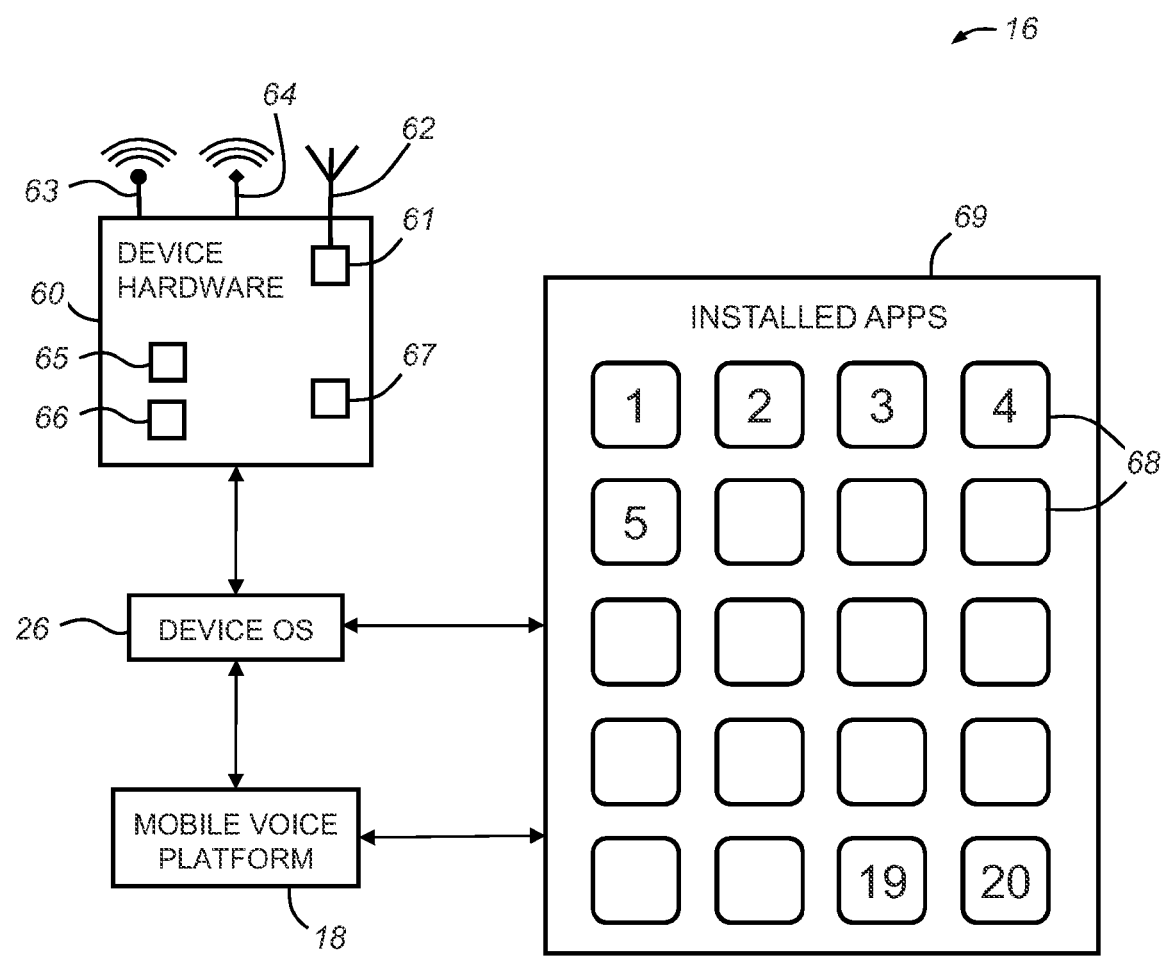
FIG. 3 is a block diagram of some of the hardware and software components of the mobile device depicted in FIGS. 1 and 2.

Although shown outside the vehicle in FIGS. 1 and 2 solely for diagrammatic illustration, the typical use of the mobile device 16 as a part of the speech user interface 10 will involve circumstances in which the mobile device in located in the vehicle, such as when the driver is operating the vehicle on the roadway. Some of the basic functional hardware and software components of mobile device 16 are depicted in FIG. 3. According to the embodiment shown, mobile device 16 is a smartphone that utilizes cellular communication according to GSM and/or CDMA standards and thus includes a standard cellular chipset 61 and antenna 62 for voice and data communications, antenna 63 and 64, and their associated circuitry for Bluetooth and WiFi wireless connections, respectively, an electronic processing device 65, one or more digital memory devices 66, and a GPS receiver 67.

Processor 65 can be any type of device capable of processing electronic instructions including microprocessors, microcontrollers, host processors, controllers, vehicle communication processors, and application specific integrated circuits (ASICs). Processor 65 executes various types of digitally-stored instructions, such as software or firmware programs stored in memory 66. This includes the device OS 26, the mobile vehicle platform 18, and any installed apps 68, all of which can be stored in memory 66.

GPS module 67 receives radio signals from a constellation 58 of GPS satellites. From these signals, the module 67 can determine mobile device position that is used for providing navigation and other position-related services. Navigation information can be presented on the device's display 69 or can be presented verbally via the device's own speaker (not shown) or via the audio user interface 14, such as may be done for supplying turn-by-turn navigation.

In general, the speech user interface 10 may be realized in part using the mobile voice platform 18 that runs on the device OS 26 and interfaces with installed apps 68, cloud services 28, or both to carry out services for the user based on their speech input. Further details of the mobile voice platform and its interaction with the other components of mobile device 16 are shown in FIGS. 4 and 5.

Figure 4:
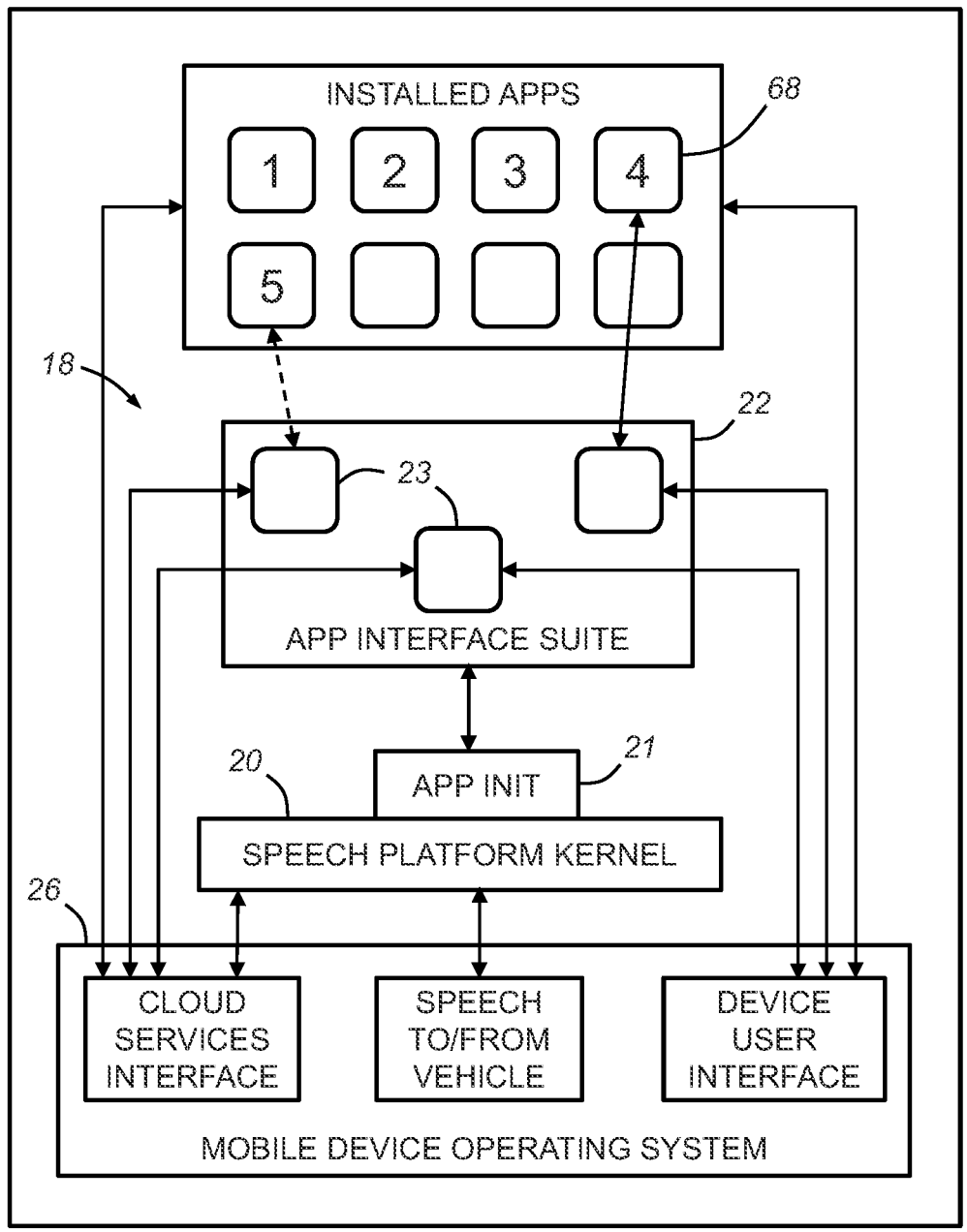
FIG. 4 depicts the tiered software structure and program module interactions of the mobile voice platform and operating system used on the mobile device of FIGS. 1-3.
Figure 5:
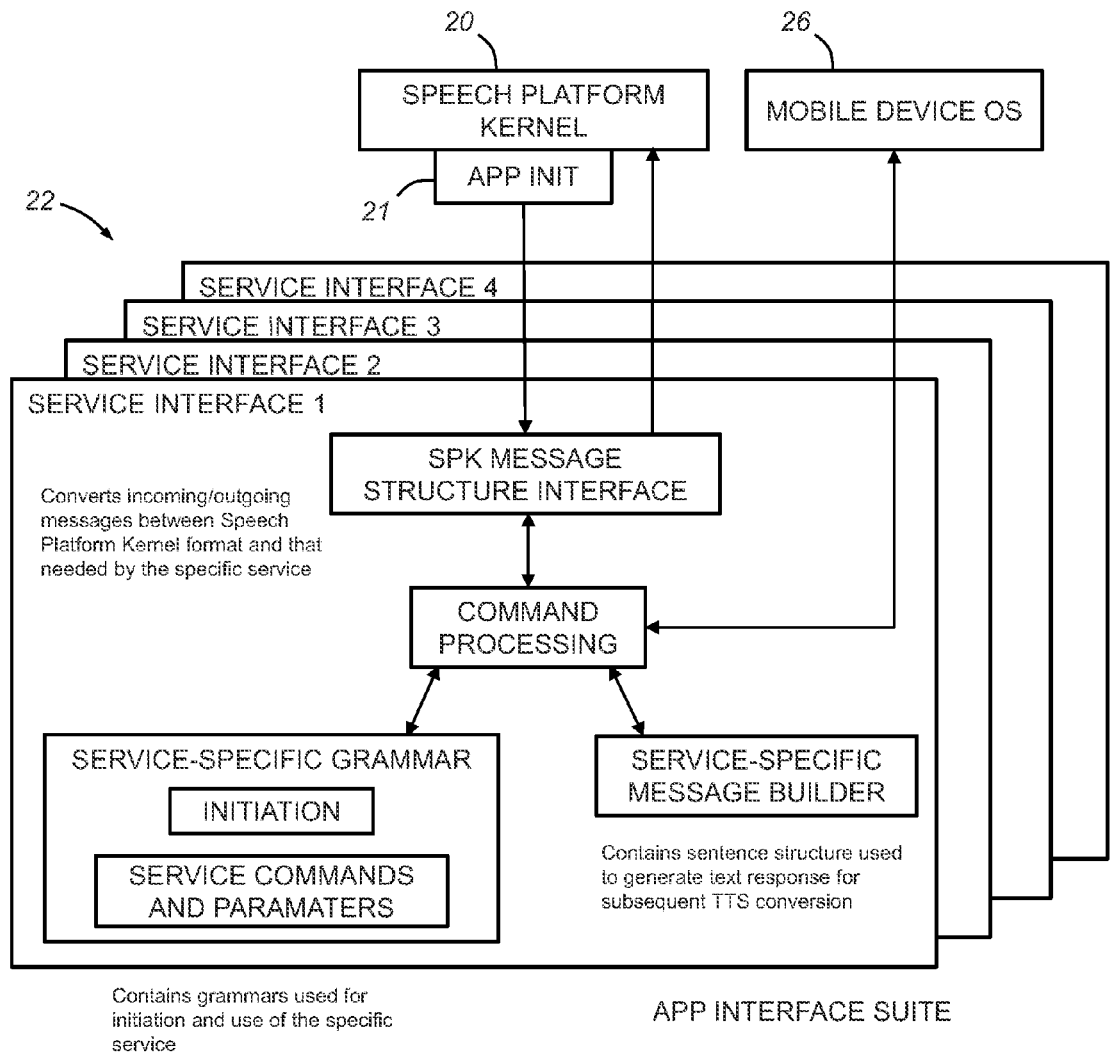
FIG. 5 depicts further details concerning the structure of service interfaces used in the application interface suite of FIG. 4.

FIG. 4 depicts different program modules each of which provide computer instructions that, upon execution by the processor 65, carry out their programmed functions using the device OS 26 to interface with the various hardware portions of the device 16. The mobile voice platform 18 includes the speech platform kernel (SPK) 20 and app interface suite (AIS) 22. SPK 20 includes an app initiator module 21 that is used to initiate a service call from SPK 20 to a service on the device (e.g., one of the apps 68) or in the cloud (e.g., one of the cloud services 28). AIS 22 includes a number of individual application service interfaces 23, each of which is associated with one of the different services available to mobile voice platform 18. The individual functions performed by the different layers is as follows:

Device OS 26:
  Provides underlying communication with Bluetooth and device connectivity controls
  Provides mobile device media player function for causing audio files to play through the speakers
  Provides microphone-driven speech recognition system for converting spoken speech into a text equivalent
  Provides inter-application communication mechanisms Speech Platform Kernel 20:
  Manages all high-level Bluetooth integration with the vehicle 12
  Maintains control over audio and microphone channels, including audio focus and gain levels which can be adjusted by SPK 20 as desired or necessary
  Provides consistent vocabulary and mechanisms for dealing with common voice interactions such as failure, pardon (didn't quite understand you), and quitting
  Processes converted speech-to-text into command structures for use by apps
  Maintains high-level app preferences related to Bluetooth devices, request management
  Provides logging and security management Service Interfaces 23:
  Each interfaces with at least one of the different services (e.g., apps) on the mobile device to provide communication with SPK 20, device OS 26, or both
  Uses a standardized command/parameter I/O protocol to interface with SPK
  Defines the grammars it supports for initiation
  Defines the grammars it supports when app is active
  Processes incoming speech-to-text command structures provided by SPK 20 and converts them into desired actions
  Connects to cloud services in order to send and receive information needed to process request
  Provides any desired device display 69 user interface As indicated above and in FIG. 4, SPK 20 runs on top of the operating system 26 and handles the overall control and routing of messaging used for the mobile voice platform. SPK 20 controls the basic process flow of the speech session according to the methodology discussed above in connection with FIG. 1 and shown in FIGS. 6-8. During a speech session in which an input (e.g., request or command) is received from a user, SPK 20 handles speech processing of the speech recognition results returned by the cloud-based automated speech recognition (ASR) service. This is done using a post-ASR service-identifying grammar specifically designed with a vocabulary intended to identify a desired service or session context from the speech recognition results. Built into this functionality is error handling and building of natural language responses for returning a speech response to the user. A session context (e.g., navigation v. messaging v. dining reservations) may also be determined at SPK 20 using this first grammar, and the session context can be used to further restrict the choice of services selected by SPK 20, or to aid in the post-ASR processing of the speech recognition result. Each speech session has at least one context; that is, at least one subject matter domain to which the user's speech input relates. The different cloud services shown in FIGS. 1 and 2 indicate some of the various session contexts that can be identified and distinguished. For any speech session, there may be a primary session context and one or more ancillary service contexts. For example, making dining reservations might invoke a dining session context in which the primary message contents being sought for include an identification of restaurant, number of people in the party, reservation time, etc. But it may also invoke a navigation context wherein directions to the restaurant are desired. Or a message context in which notification of the reservation is shared with others. SPK 20 not only determines a primary session context, but one or more ancillary ones, if appropriate, and for each, identifies an appropriate cloud or installed service.

The speech services identified in FIGS. 1 and 2 can be implemented in various ways and in some embodiments, may be uniquely designed or contain specific grammars or models designed to support the speech user interface 10. In other embodiments, a generalized cloud ASR service is used; that is, one in which, although it may permit parameter specifications for particular language models and other general configurations of the speech recognition engine, does not use a grammar tailored to the session contexts expected for the user speech session. The android.speech functionality available from Google is one example of a generalized cloud ASR service.

Once SPK 20 has identified or otherwise determined a desired service, it uses the App Init 21 to start the selected service via a service interface 23 associated with that service. As indicated in FIG. 4, some of the service interfaces 23 interact only with cloud services, or only with cloud services and the device user interface (e.g., display 69), whereas others interface with the installed apps (e.g., app 4) that itself may access cloud services using the operating system's interface to the cloud services. This permits each service interface to carry out the selected service as desired so that, for example, if a particular service desires to use the display 69 of the mobile device, the service interface can define the particular user interface to be displayed.

Turning now to FIG. 5, further detail of the service interfaces 23 is shown. Each service interface 23 includes a SPK message structure interface that follows the standardized I/O protocol used by SPK 20 for messaging to the service interfaces. This provides a common framework for interacting with the mobile voice platform so that new services can be accessed by creating a service interface that meets the SPK 20 I/O specification while identifying to SPK 20 the commands and parameters needed to call and receive results from the service. The service interface includes command processing that uses a service-specific grammar to construct a service request and then send that service request to the cloud service or installed app via the OS 26. The service request will typically include any needed command from the service interface plus at least a part of the recognized speech results (e.g., a particular restaurant name) or associated data (e.g., GPS coordinates). The service-specific grammar is one that includes vocabulary used for initiating and commanding the service and will typically be different for each different computer-based service.

The App Init module 21 of SPK 20 can be implemented with the same structure as the service interfaces, except that it is a special purpose interface that is used by SPK 20 to contact a selected service interface to initiate the service and pass the needed commands and parameters used by the service.

Figure 6:
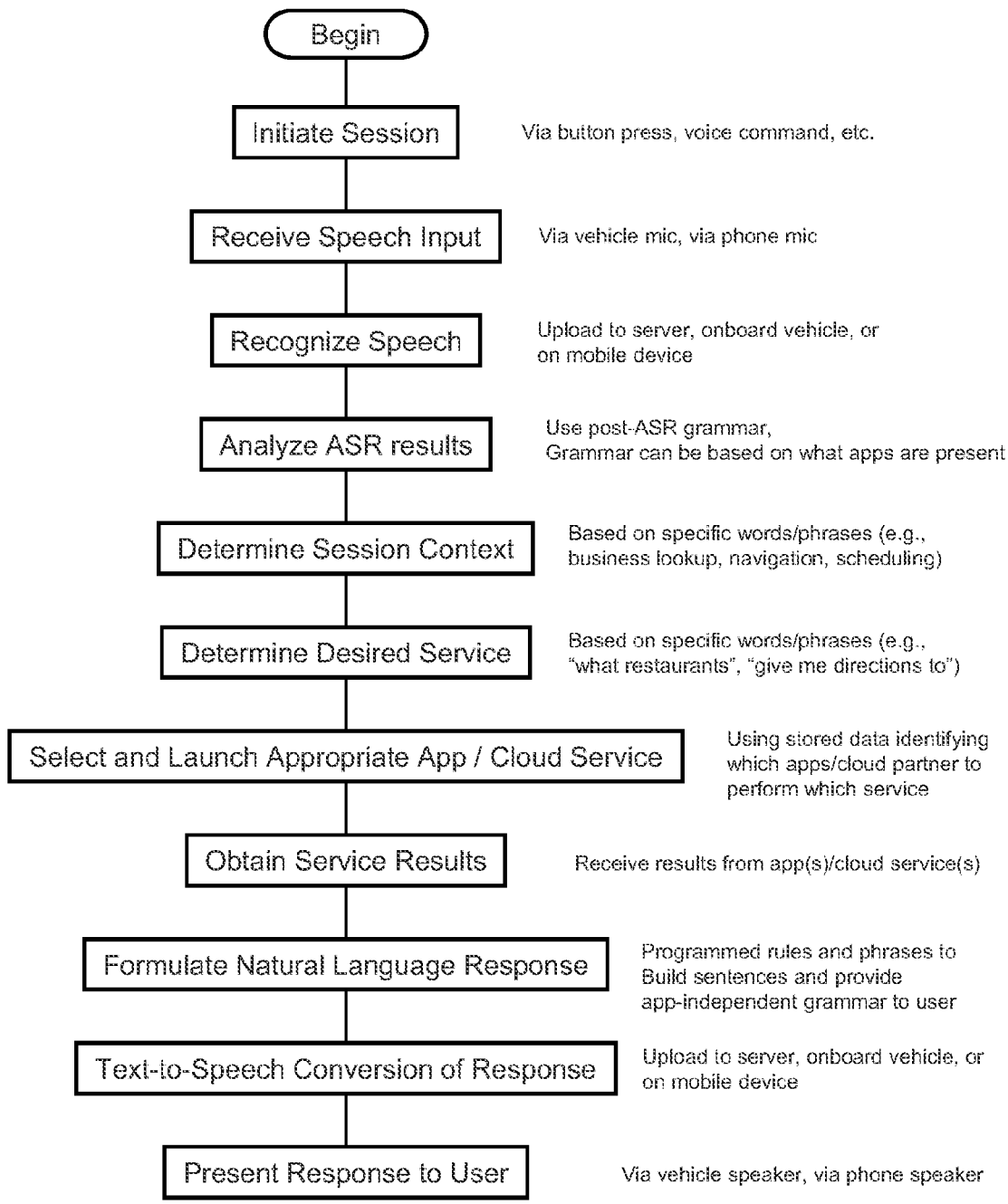
FIG. 6 is a flowchart of a method that can be used with the speech user interface of FIGS. 1 and 2 to provide a user with a completed hands-free speech session.

FIG. 6 depicts a flowchart of a complete speech session that can be used to provide hands free or even fully hands free operation of the mobile device by a driver in a vehicle.

Figure 7:
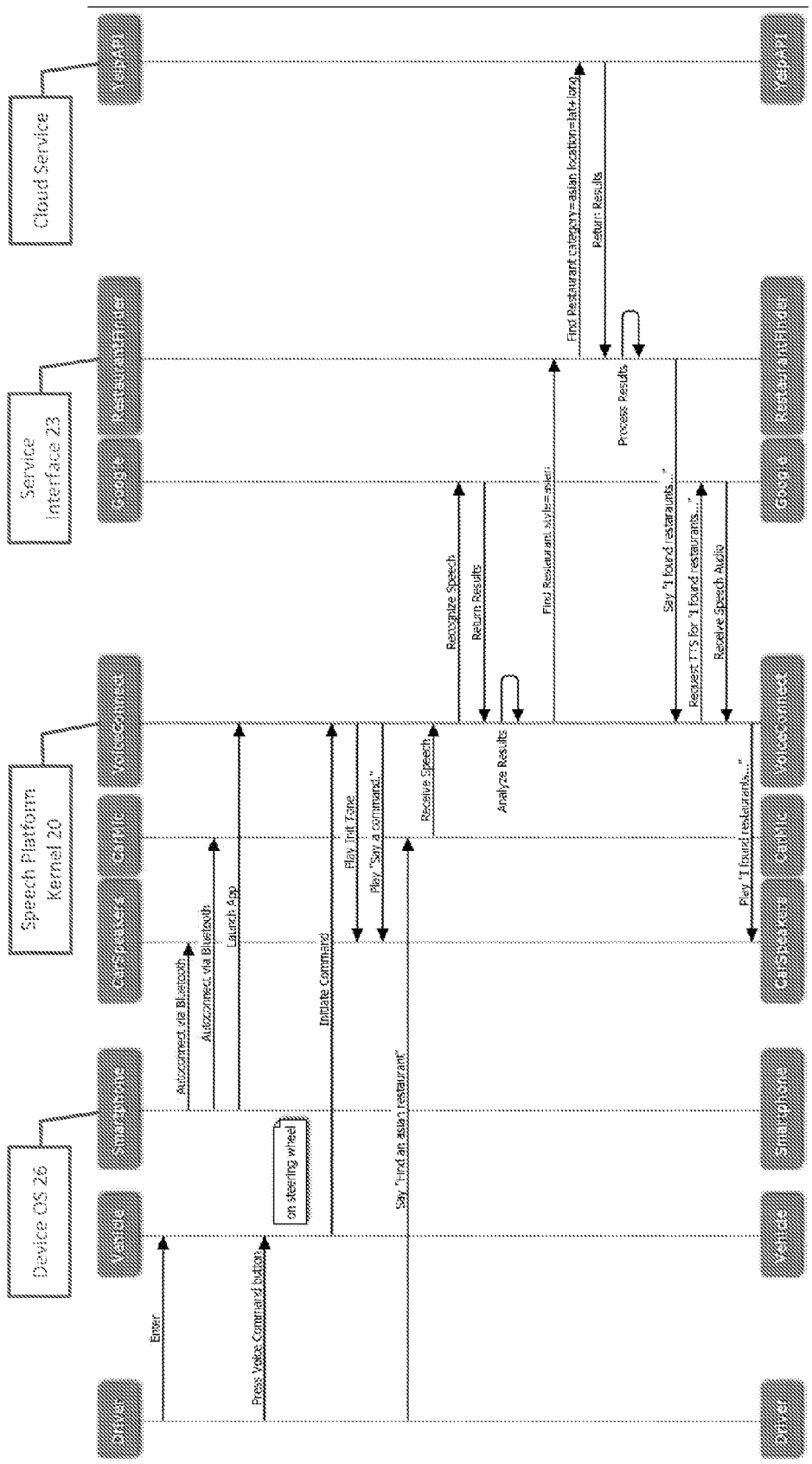
FIG. 7 is a sequence diagram showing messaging flows for a sample speech session.
Figure 8A:
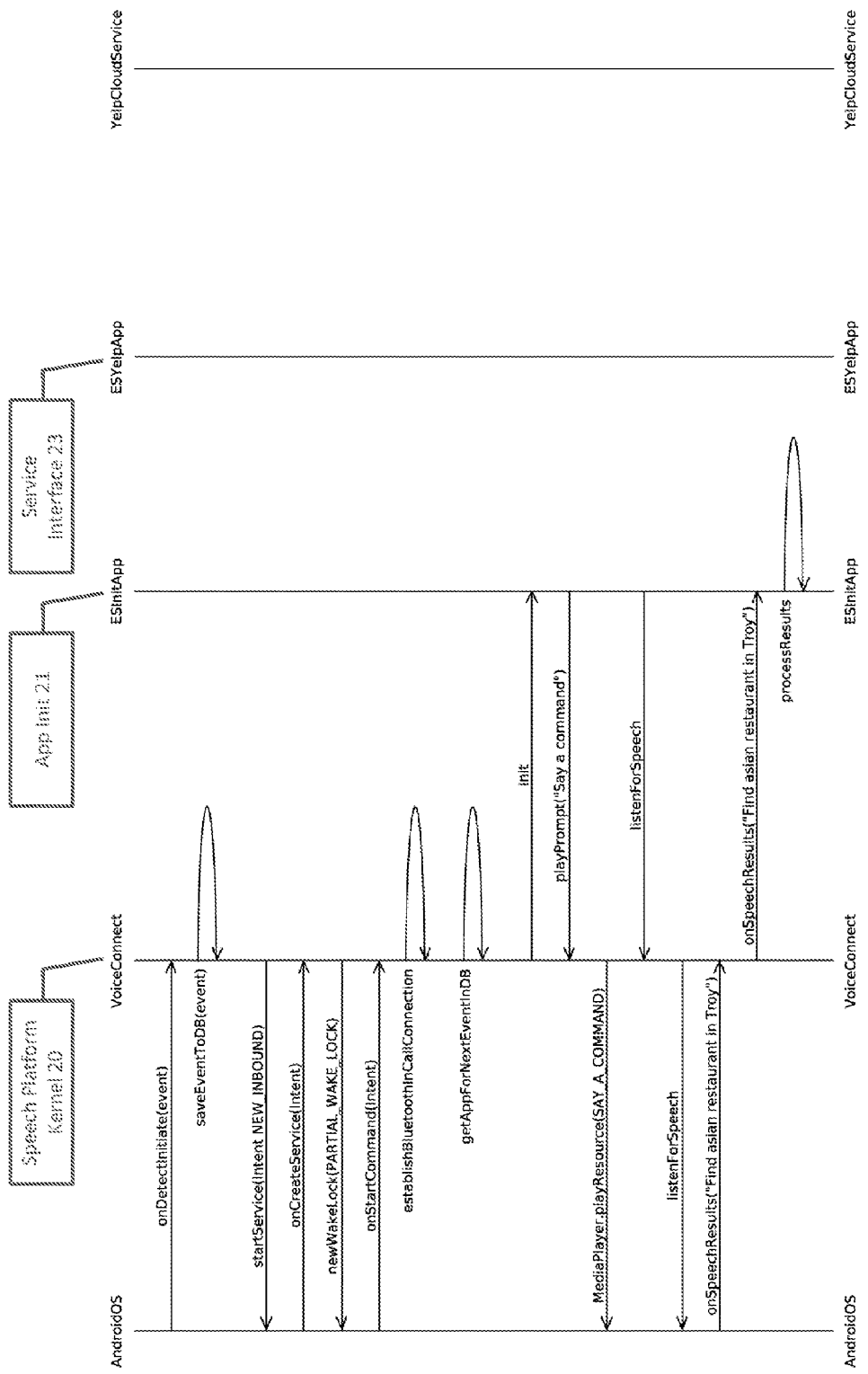
FIG. 8 comprises FIGS. 8A and 8B and is another sequence diagram showing messaging flows for another sample speech session.
Figure 8B:
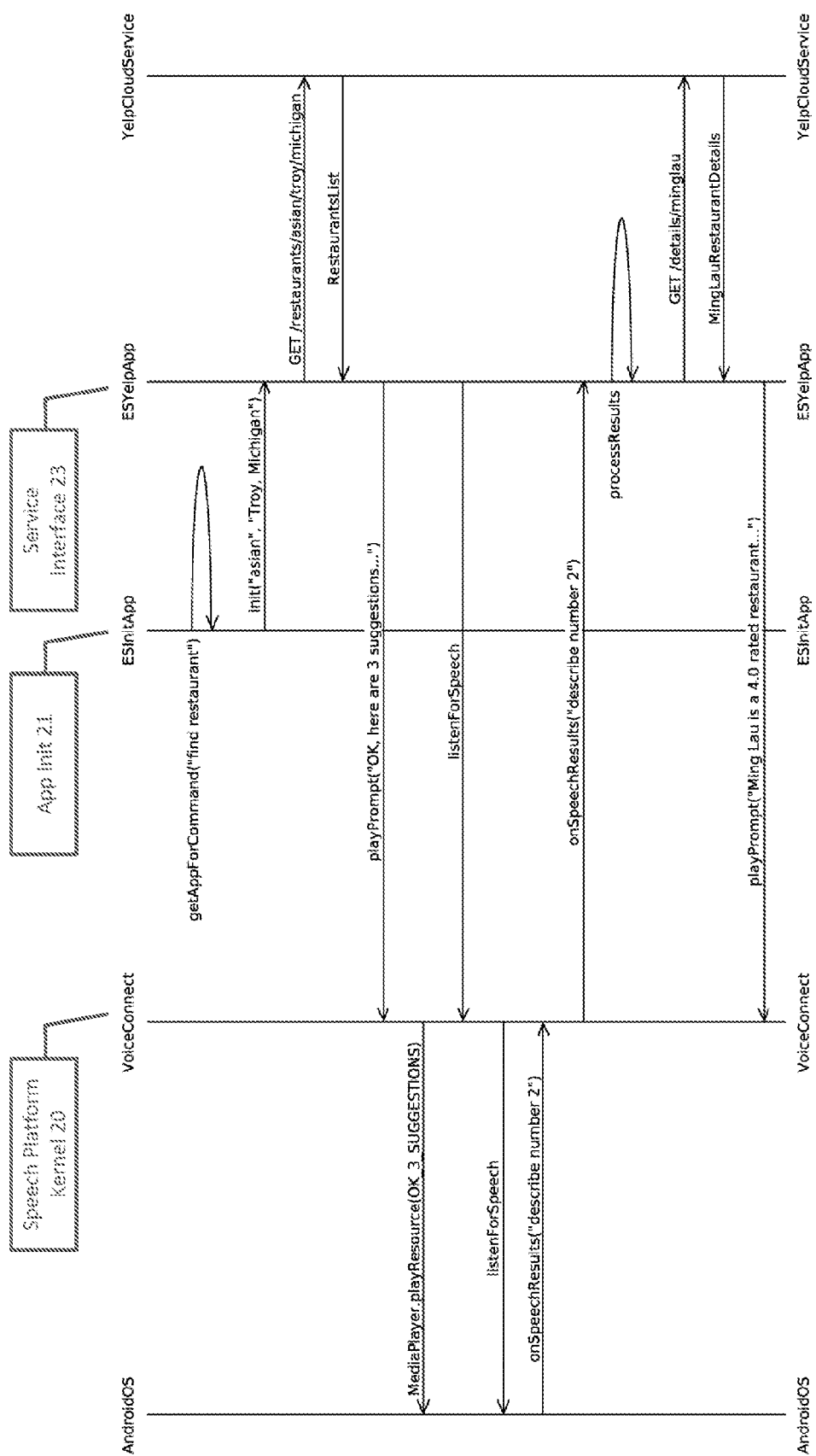

FIGS. 7 and 8 provide more detailed examples of a completed speech session showing the various inter-module and inter-device calls and sequences to request a service, obtain a result, and provide it to the vehicle driver, all via the audio user interface 14.

Figure 9:
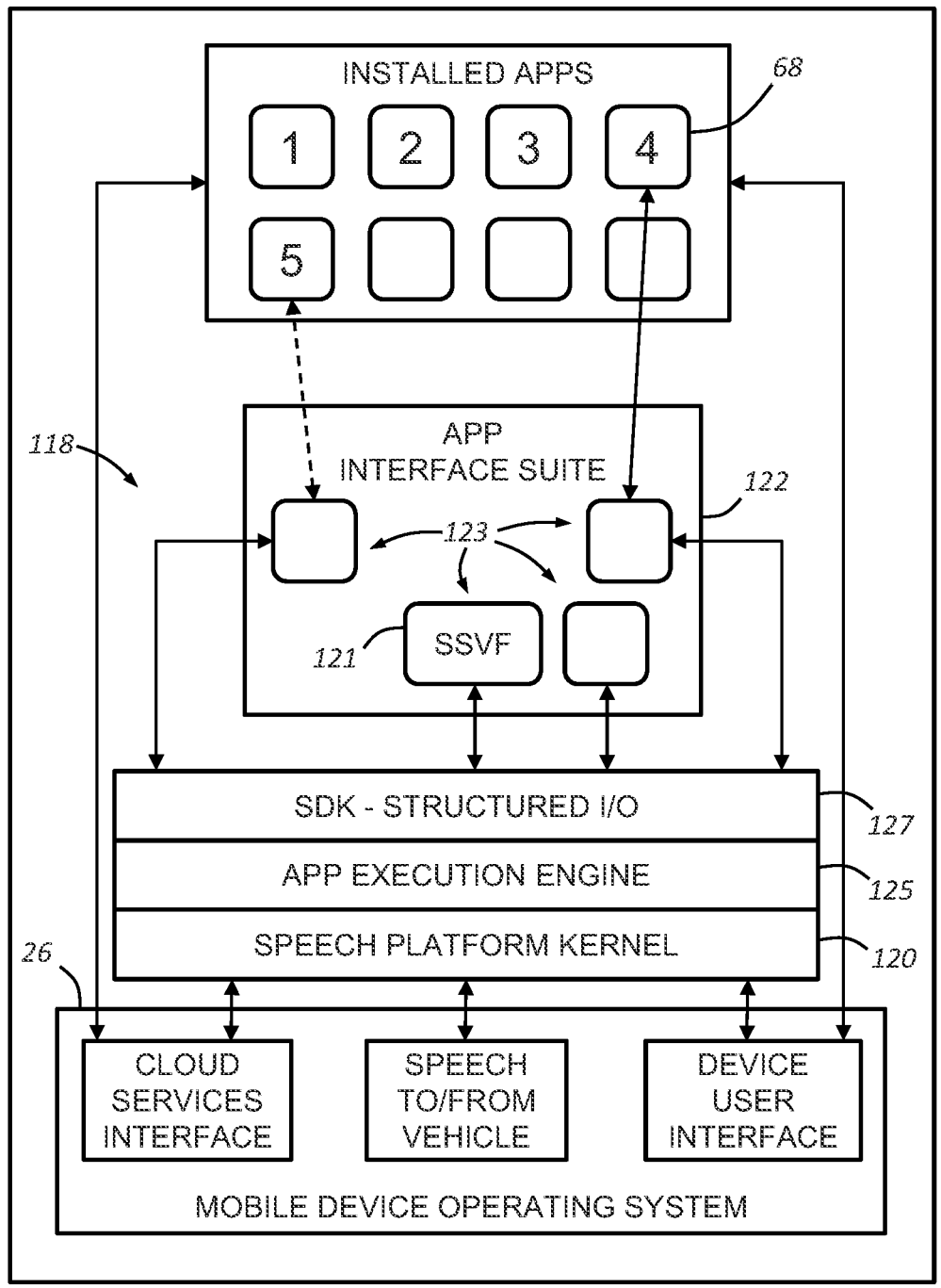
FIG. 9 depicts an alternative embodiment of the tiered software structure and program module interactions shown in FIG. 4.

FIG. 9 depicts an alternative embodiment of the software architectural design, wherein like reference numerals denote like elements from FIG. 4. This embodiment 118 of the mobile voice platform is similar to FIG. 4 in that it includes a first program module (SPK 120) and second program module (AIS 122), but uses the individual service interfaces 123 to define the voice flow needed for a particular service to the which the service interface relates. This is done using scripts that define the handling of speech recognition results, calls to the cloud (computer-based) service, and handling of additional minimally-required or otherwise desired information. For example, requesting a reservation for dinner at a particular restaurant at 6:00 pm leaves out what may be considered minimally-required information; namely, the number of people in the party. The service interface 123 associated with the requested dining reservation service may include programming to determine the missing information and provide a response message (such as "how many in your party?"), which may then be provided to SPK 120 for conversion to speech and presentation to the user via the OS 26. As with SPK 20 discussed above, SPK 120 may also provide common grammar and constraints as well as common responses that are used at least somewhat independently of the particular service being accessed so that similar or identical queries or responses from different services that are phrased differently may be converted by SPK 120 into common phrases or grammar. As one example, two different services may provide different queries for the same information (e.g., "how many people" versus "what size is your party") could be translated by SPK 120 into a common phrase (e.g., "how many are in your party").

Operation of the service interfaces 123 can be by way of an app execution engine 125 that provides a runtime execution environment for the service interfaces. An SDK (software developer kit)—defined protocol 127 provides a set of standard or common input/output tags or other identification of the data and commands passed between SPK 120 and the service interfaces 123. This can be done, for example, using VXML, wherein SPK 120 tags the individual portions of the received speech recognition results using SDK protocol 127 and, in some embodiments can convert them to a smaller vocabulary that is at least partially shared among the service interfaces. For example, "a restaurant in the area" as speech input may be broken down into "restaurant" being tagged as the desired service or session context, and "in the area" being converted (as are such other general location terms—"around here", "near me", etc.) into a single term "nearby" which is supported by all of the service interfaces for which location is used to carry out the service.

One of the service interfaces 123 may be a speech session voice flow (SSVF) 121 that may perform the same or similar functionality of App Init 21 of FIG. 4. Thus, when a speech session is begun (e.g., by an input to the mobile device 16 directly by the user or via a button press in the vehicle that is used to signal the mobile device 16 via its short range wireless communication circuitry 63), SPK 120 can initially invoke the SSVF script which defines the voice flow for the speech session communication with the user. For example, it can specify that the user is prompted with the statement "Please say a command" and then can define the actions taken based on the response all the way up until a desired service is identified and the associated service interface invoked.

Figure 10:
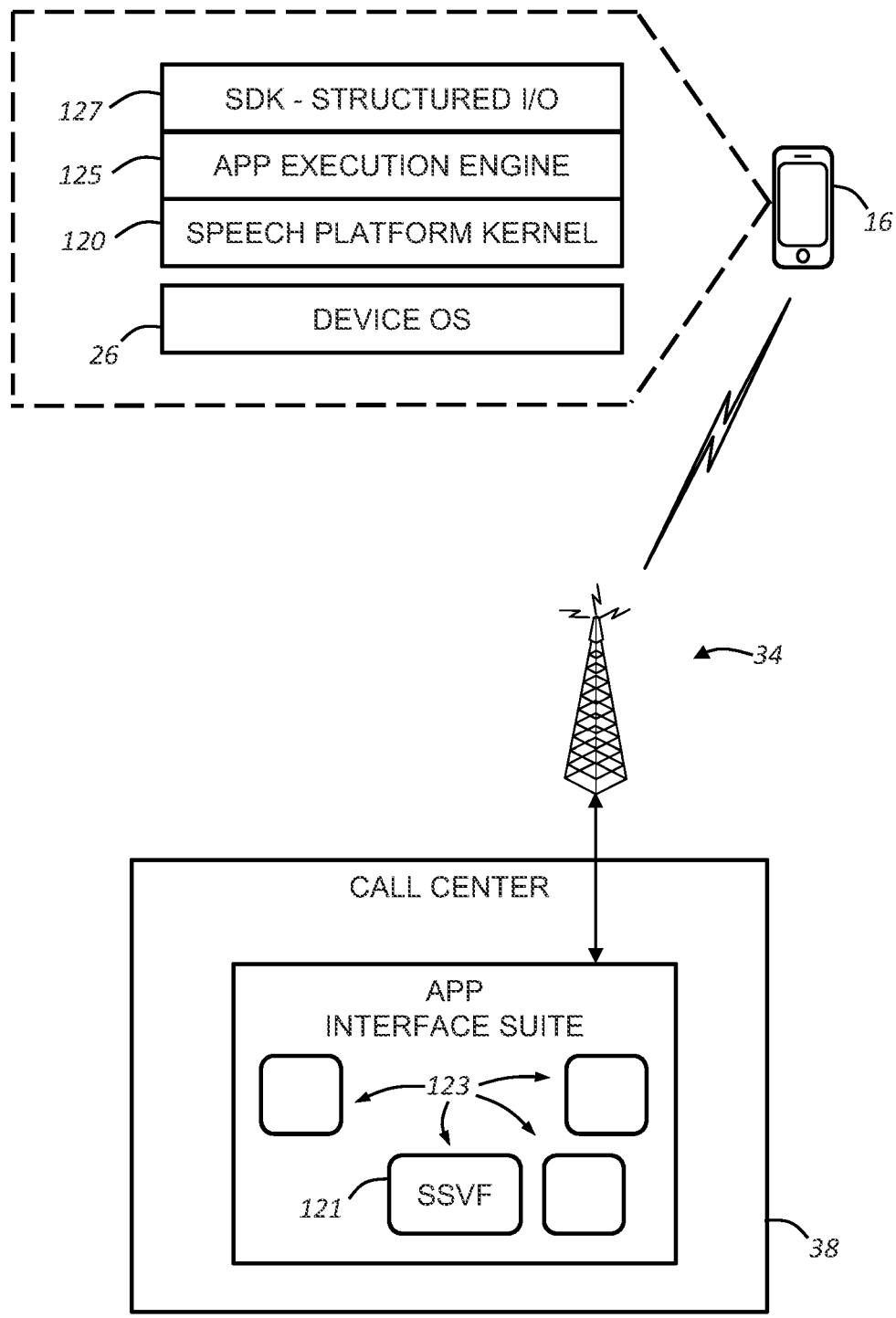
FIG. 10 depicts a modified implementation of the embodiment of FIG. 9.

The various program modules shown in the figures can be stored in one or more non-transient memories 66 (e.g., flash memory) on the mobile device 16 as computer instructions that, upon execution by the processor 65, carries out the functions described above. In other embodiments, at least some of the program modules may be stored remotely, such as on a remote server or other computer and accessed as necessary. For example, as shown in FIG. 10, the app interface suite (AIS) 122 can be stored at a remote location such as the call center 38, or at some other remote facility or computer. Then, when SPK 120 needs any of the service interfaces, such as SSVF 121 at the start of a speech session, it can remotely access the service interface via the cellular carrier system 34, download it, and run it locally at the mobile device 16 using the app execution engine 125. Similarly, once a desired service is identified, the associated service interface 123 can be remotely accessed, downloaded to the mobile device, and again run to implement the desired service, including generating the needed service request used to interface with a particular remote computer-based service (e.g., via the service's API). An advantage of this remote storage of the service interfaces is that they can be maintained and updated as desired, whereas if they are stored normally on the mobile device, they will need to be periodically updated which, for some mobile device platforms, may require obtaining user consent each time. With remote storage, if there is a change to be made to the service interface (e.g., because the associated service has been enhanced) then only the single version at the call center or other remote location needs to be updated and users will receive the latest version each time they provide a speech command or request that utilizes the service. This also allows the voice interaction defined by the service interface to be updated as desired so that, for example, if it is desirable to change SSVF 121 from saying "Please say a command" to "What can I help you with today?", this can be done back at the call center, again without users each needing to have the software on their mobile device updated. Remote storage and maintenance of AIS 122 or individual service interfaces 123 can all be maintained together (e.g., at a single server or group of servers) or at least some may be separately maintained (e.g., by different third party entities). In this regard, the different service interfaces 123 corresponding to different services (e.g., apps on the mobile device) could be produced, stored, and updated by the different third parties who created the associated service (app).

Access and use of the service interfaces 123 may be carried out in any of a number of different ways, at least some of which will be apparent to those skilled in the art. For example, as shown in FIG. 10, the AIS 122 may include a central registry 129 that, for each of at least some of the service interfaces 123, stores information concerning under what circumstances it is to be invoked (e.g., in response to determining what spoken request was given by the user) as well as how it is to be invoked (e.g., by executing it on the mobile device if stored locally, or by a URL or other address used for accessing it from a remote location). The central registry may be incorporated into AIS 122 (whether on the mobile device or remotely stored), or may be stored apart from the AIS 122. Known approaches for adding and removing registry entries for the different service interfaces 123 may be used.

Figure 11:
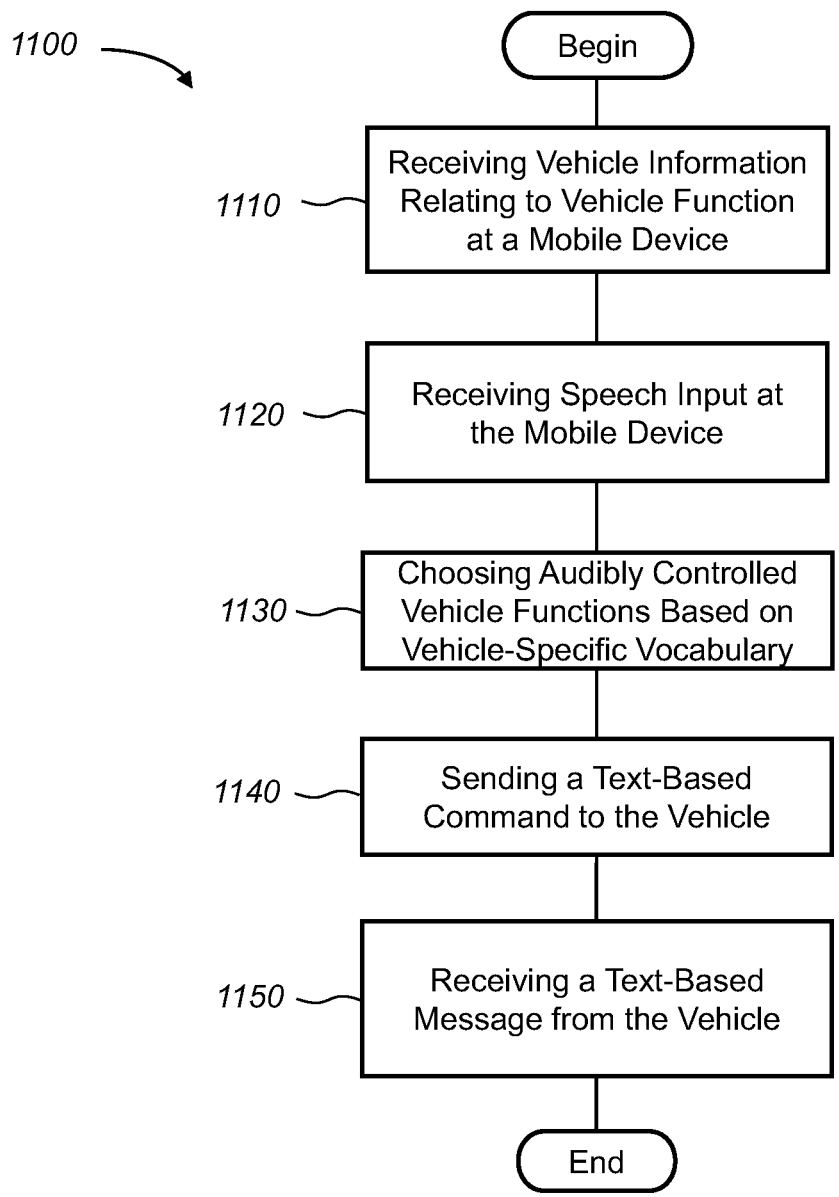
FIG. 11 is a flowchart of another method that can be used with the speech user interface of FIGS. 1 and 2 to provide a user with a completed hands-free speech session.

Turning to FIG. 11, a method of providing hands-free services using a mobile device having wireless access to computer-based services is shown. This method can assist a user, such as a vehicle occupant or driver, to control one or more vehicle functions using speech alone. And the vehicle functions that are affected by this control can be identified based on the user speech and a determination can be made whether or not the affected vehicle operations or functions may benefit from cloud-based services. This is described in one embodiment as method 1100, which begins at step 1110 by receiving vehicle information relating to vehicle function at the mobile device 16 from a vehicle 12 linked to the mobile device 16 via a short-range wireless connection. The received vehicle information can be presented as part of an audible message to a vehicle occupant thereby conveying the received vehicle information. The vehicle 12, through its VSMs 47, can receive and make available a wide array of information that can then be presented to a user, such as a vehicle occupant, in audible form. For instance, the vehicle 12 can receive vehicle data or vehicle information that relates to vehicle operation from one or more VSMs 47. In one example, the vehicle 12 can include a VSM 47 that is responsible for the fuel level of the vehicle 12 and once the fuel level falls below a predetermined level, the VSM 47 can generate an alert that can be made available to the vehicle 12 and/or another device, such as the mobile device 16 via a short-range wireless connection. The fuel level status can then be audibly presented to the vehicle occupant using the mobile device 16. That is, the mobile device 16 can ultimately receive the alert generated by the VSM 47 from the vehicle 12 over the short-range wireless connection as text-based information and convert the text-based information to speech using the techniques discussed above. In another example, the body control VSM 47 can determine that a door of the vehicle 12 is ajar and indicate this to the vehicle 12. The vehicle 12 can then send the status of the door to the mobile device 16, which can then audibly present the fact that the door is ajar/open to the vehicle occupant. It is possible to present the vehicle data or vehicle information to the vehicle occupant as digitized speech that is generated at the mobile device 16, wirelessly sent to the audio interface 14, and played using the speakers of audio interface 14. The method 1100 proceeds to step 1120.

At step 1120, speech input can be received at the mobile device 16 that is linked to a vehicle 12 via a short-range wireless connection. This speech input can be received unprovoked from the vehicle occupant or it can be in response to the vehicle data/information audibly presented at step 1110. That is, the vehicle 12, using its VSMs 47, can generate vehicle information that may be of interest to the vehicle occupant and upon receiving this information the occupant can request more information or command the vehicle 12 through speech to do something. However, it is also possible that the vehicle occupant wants to command the vehicle 12 to do something or wants the vehicle 12 to provide information related to vehicle operation without responding to previously-provided vehicle information. In that case, the vehicle occupant can provide speech input to the mobile device 16 (e.g., through audio interface 14) that includes a vehicle command or a request for vehicle information. The mobile device 16 can listen for the provided speech input in response to a command from the user to enter a state of readiness. During the state of readiness, the mobile device 16 via a mobile voice platform (MVP) 18 will know to listen for and receive speech input from the vehicle occupant. It should be appreciated that the mobile device 16 can be commanded to enter the state of readiness in a variety of ways. For example, the vehicle occupant can direct the mobile device 16 and/or MVP 18 to enter the state of readiness via the push of button/control input 44, which can be located on the steering wheel of the vehicle 12 (e.g., a button to actuate "hands-free" communication). In another example, the state of readiness can be initiated using a virtual button displayed via the user interface of the mobile device 16. Using the method 200, it is possible to initiate the state of readiness using either button/control input 44 or a button generated by the user interface of the mobile device 16.

However, it should be understood that the state of readiness can be entered in other ways that are not dependent on the buttons or control inputs described above, regardless of whether they are carried by the vehicle 12 or the mobile device 16. For example, the state of readiness can be entered based on a voice input, such as a keyword (e.g., the word "Jefferson") spoken by the vehicle occupant and received by the mobile device 16 and/or MVP 18, which activates the state of readiness. Or in another example, a gesture made by the vehicle occupant, such as waving a hand in front of a camera located in the vehicle 12, could activate the state of readiness. In yet another example, a conditional input can be used to initiate or activate the state of readiness. An example of conditional input includes placing a gearshift lever of the vehicle 12 in the park position. And the state of readiness could also be activated by situational input. In one an example of how situational input can be implemented, the vehicle 12 can detect that the windows and/or sunroof of the vehicle 12 are open and also receive a particular weather forecast, such as a forecast for rain. Based on the combination of open windows/sunroof and the weather forecast, the vehicle occupant can be audibly informed of the weather forecast and/or asked if the windows/sunroof should be closed. After audibly informing the vehicle occupant, the state of readiness can be entered.

The speech input can be originally received in the vehicle 12 and then communicated to the mobile device 16, which ultimately receives that speech at the MVP 18 resident on the mobile device 16. The received speech can be passed between the audio user interface 14 and the mobile device 16 via the short-range wireless connection using antenna 40. Once speech is received at the mobile device 16, vehicle-specific vocabulary included in the received speech input can be identified. This can involve parsing the received speech using the mobile voice platform 18 to identify vehicle-specific vocabulary and when vehicle-specific vocabulary exists, identifying one or more vehicle-specific vocabulary terms that affect at least one vehicle function of an inter-related group of vehicle functions. While a wide variety of vocabulary may be included in the received speech, it can be helpful to identify words that relate or may be related to particular vehicle functions and/or vehicle information. And this can be carried out in a variety of ways. In one example, the received speech can be passed to the (cloud) speech services 24 and an ASR result can then be returned to the MVP 18 at the mobile device 16.

The ASR result can be generated in text form and then sent from speech services 24 to the mobile device 16. The MVP 18 can then carry out a post-ASR processing of the ASR result. The MVP 18 can direct the service interfaces 23 to access a vehicle-specific vocabulary and carry out post-ASR services using vehicle-specific vocabulary. The vehicle-specific vocabulary can be included in a service-specific grammar. While a wide variety of terms are potentially relevant, some examples of vehicle-specific vocabulary include words such as "fuel," "tires," and "radio" to name a few.

Using vehicle-specific vocabulary, the MVP 18 and/or the service interfaces 23 can determine whether the speech includes a request for vehicle data, a request for information about a vehicle condition, or a command to control some aspect of vehicle function. In this sense, the MVP 18 provides a unified interface that permits a vehicle occupant or driver to provide input orally and receive information audibly. As a result, the vehicle occupant/driver can control the vehicle 12 without visual information. In one example, the received speech (or ASR result) can be parsed to identify whether the user is requesting vehicle data (e.g., "how much fuel do I have?"), requesting information about a vehicle condition (e.g., why is the check engine light on?"), or commanding the vehicle 12 to do something (e.g., "turn up the radio"). The service-specific grammar can include not only the vehicle-related vocabulary or terms, but also other commonly-used vehicle commands or queries. The method 1100 proceeds to step 1130.

At step 1130, one or more vehicle functions chosen from an inter-related group of vehicle functions are audibly controlled based on the identified vehicle-specific vocabulary included in the received speech. Each of vehicle-specific term/word and commonly-used vehicle command can be associated with at least one of an inter-related group of vehicle functions affected by the command/query. Using the examples above, when a vehicle occupant asks "how much fuel do I have?" the word "fuel" can be categorized as vehicle-specific vocabulary and also linked with a VSM 47 that is responsible for the fuel level of the vehicle 12. In another example, when the vehicle occupant asks "why is the check engine light on?" the term(s) "check engine light" can be associated with a diagnostic VSM 47 and the vehicle 12 can direct the diagnostic VSM 47 to search for diagnostic trouble codes (DTCs). Ultimately, the vehicle 12 can be directed to access information from or control a particular VSM 47 based on the vehicle-specific vocabulary. In yet another example, the vehicle occupant can ask to "turn up the radio." The vehicle-specific word "radio" can be associated with the VSM 47 that controls radio function and detection of the word "radio" in the received speech can then involve controlling the VSM responsible for radio function.

A number of other VSMs used in the vehicle 12 can also be implemented as part of method 1100. For example, the vehicle 12 can also use an instrument panel VSM, an infotainment VSM, a climate control VSM, and/or a navigation VSM, to name a few. And while each of the VSMs 47 (e.g., fuel, diagnostic, radio control) have been described individually, it should be appreciated that each VSM 47 may be responsible for more than one function and/or the VSMs may carry out a single function using two or more VSMs. And even though one VSM 47 may carry out a function, it may also be related to or be able to act in concert with other VSMs. Using one of the examples above involving the question "how much fuel do I have?" it is possible to not only access the fuel level with one VSM 47, but to also get directions to nearby gas stations using a different VSM 47 (e.g., a navigation VSM 47 that includes a GPS chipset).

Moreover, the detection of vehicle-specific vocabulary can be optionally used to call up cloud services 28. Whether or not cloud services are invoked can be determined based on whether the chosen vehicle functions can benefit from cloud services. For example, when the user or vehicle occupant asks "how much fuel do I have?" the MVP 18 can identify one or more vehicle-specific words that have been designated as benefiting from cloud services 28 (e.g., "fuel") and access a cloud-based source that locates gas stations near the vehicle 12. Vehicle-specific words that benefit from cloud services 28 can be established by the user or can be pre-programmed and stored at the mobile device 16. Alternatively, there may be vehicle-specific vocabulary that is identified as not benefitting from cloud services. For example, if the vehicle occupant requested the vehicle 12 to lock the doors, the word "door" could be identified as not benefitting from cloud services 28 and a determination can be made not to invoke cloud services 28. The method 1100 proceeds to step 1140.

At step 1140, a text-based command is generated based on the identified vehicle-specific vocabulary and/or vehicle function and sent from the mobile device 16 to the vehicle 12 via the short-range wireless connection. When a match occurs between the interpreted speech and one of the vehicle-related vocabulary, vehicle commands, or vehicle queries, a text-based command can be generated to carry out an action. The text-based command can request data from the vehicle 12 relating to vehicle operation associated with the vehicle-specific vocabulary or vehicle query. The vehicle 12 can receive and read the text-based command thereby sending an instruction to a particular VSM 47 identified in the message over the vehicle bus 49. In one example, when the received speech (or ASR result) requests vehicle data (e.g., "how much fuel do I have?"), the text-based command can include an instruction for the VSM 47 responsible for vehicle fuel level to provide the current fuel level. In another example, when it has been determined that the user requests information about a vehicle condition (e.g., why is the check engine light on?"), the text-based command can include an instruction for the VSM 47 responsible for diagnostics to identify any existing DTCs. Or if it has been determined that the user is commanding the vehicle 12 to do something (e.g., "turn up the radio"), the text-based command can include an instruction for the VSM 47 responsible for radio control to increase radio volume. The vehicle 12 can gather data, such as fuel level data or DTCs, over the vehicle bus 49 from VSMs 47 located at the vehicle 12 in response to the text-based command. The method 1100 proceeds to step 1150.

At step 1150, a text-based message can be received at the mobile device 16 from the vehicle 12 and include information pertaining to the vehicle 12. If the vehicle occupant has requested information from the vehicle 12, the vehicle 12 can respond to the text-based command with a text-based message that includes the requested vehicle data. For example, using the fuel-level request above, the vehicle 12 can embed the fuel-level data gathered from the VSM 47 or a text-based message explaining the fuel level in a text-based message and communicate the message from the vehicle 12 to the mobile device 16 over the short-range wireless connection. It should also be appreciated that the text-based message can also be used to confirm a text-based command for controlling vehicle operation. For instance, when the vehicle occupant asked to turn up the radio, the vehicle 12 can generate and send a text-based message confirming that the volume of the radio has been increased. The text-based message is intended to be ultimately converted to an audibly-playable informational message using text-to-speech (TTS) or other similar technology. This can be carried out at least partly by the MVP 18 and the audibly-playable informational message can be presented in the vehicle 12 using audio interface 14. The audibly-playable informational message can be chosen from a number of predetermined phrases that reflect commonly used replies to vehicle occupants. Using the examples discussed above, the audibly-playable informational message can be "you have X gallons of fuel remaining" or "the volume has been turned up" or "tighten your fuel cap to deactivate the check engine light." These audibly-playable informational messages can be presented in the vehicle 12 in a variety of ways, such as by playing them through the speakers in the vehicle 12 or via the speakers of the mobile device 16. The method 1100 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing hands-free services using a mobile device having wireless access to computer-based services, the method comprising:
   (a) establishing a short-range wireless connection between a mobile device and a vehicle;
   (b) receiving speech in the vehicle that is communicated to a mobile voice platform resident on the mobile device via the short-range wireless connection;
   (c) parsing the received speech using the mobile voice platform to identify vehicle-specific vocabulary;
   (d) when vehicle-specific vocabulary exists, identifying at least one vehicle function of an inter-related group of vehicle functions that is associated with the identified vehicle-specific vocabulary;
   (e) determining whether to access one or more cloud services based on the identity of the vehicle function;
   (f) generating a text-based command reflecting audible control of the affected vehicle function; and
   (g) sending the text-based command from the mobile device to the vehicle over the short-range wireless connection.

2. The method of claim 1, further comprising the step of carrying out the inter-related group of vehicle functions using a plurality of vehicle system modules (VSMs).

3. The method of claim 1, further comprising the step of carrying out the inter-related group of vehicle functions using an instrument panel vehicle system module (VSM), an infotainment VSM, a climate control VSM, a navigation VSM, or a diagnostic VSM.

4. The method of claim 1, further comprising the step of receiving the speech via an audio user interface.

5. The method of claim 1, further comprising the step of identifying the received speech as originating in the vehicle.

6. The method of claim 1, further comprising the step of determining whether to access one or more cloud services based on a list of vehicle-related vocabulary terms.

7. The method of claim 1, further comprising the step of determining whether the received speech includes: a request for vehicle data, a request for information about vehicle condition, or a command to control an aspect of vehicle function.

8. A method of providing hands-free services using a mobile device having wireless access to computer-based services, the method comprising:
   (a) receiving vehicle information relating to vehicle function at a mobile device from a vehicle linked to the mobile device via a short-range wireless connection;
   (b) presenting an audible message to a vehicle occupant that conveys at least some of the received vehicle information in response to the received vehicle information;
   (c) receiving speech input at the mobile device from the vehicle occupant in reply to the audible message;
   (d) identifying vehicle-specific vocabulary included in the received speech input using a mobile voice platform resident on the mobile device that is capable of carrying out speech recognition using a cloud-based service; and
   (e) audibly controlling one or more vehicle functions chosen from an inter-related group of vehicle functions based on the identified vehicle-specific vocabulary included in the received speech.

9. The method of claim 8, further comprising the step of carrying out the inter-related group of vehicle functions using a plurality of vehicle system modules (VSMs).

10. The method of claim 8, further comprising the step of carrying out the inter-related group of vehicle functions using an instrument panel vehicle system module (VSM), a body control VSM, an infotainment VSM, a climate control VSM, a navigation VSM, or a diagnostic VSM.

11. The method of claim 8, further comprising the step of receiving the speech input via an audio user interface.

12. The method of claim 8, further comprising the step of identifying the received speech input as originating in the vehicle.

13. The method of claim 8, further comprising the step of determining whether to access one or more cloud services based on a list of vehicle-related vocabulary terms.

14. The method of claim 13, further comprising the step of establishing the list of vehicle-related vocabulary terms with user input.

15. The method of claim 8, further comprising the step of determining whether the received speech includes: a request for vehicle data, a request for information about vehicle condition, or a command to control an aspect of vehicle function.

16. A system of providing hands-free services using a mobile device having wireless access to computer-based services comprises:
   a mobile device capable of both short-range wireless communications and cellular communications, wherein the mobile device wirelessly receives spoken input from a vehicle occupant via an audio user interface integrated with a vehicle as well as vehicle data generated by one or more vehicle system modules on the vehicle; and
   a mobile voice platform software application stored on the mobile device capable of accessing cloud services upon detecting vehicle-related vocabulary in the received spoken input, generating an audibly-playable response to the vehicle occupant when the detected vehicle-related vocabulary affects one or more aspects of vehicle operation, and carrying out a vehicle command included with the spoken input that affects one or more vehicle system modules.

17. The system of claim 16, wherein the mobile voice platform carries out speech recognition using cloud-based speech services.

* * * * *